March 1, 1938.   N. S. BOOTH   2,109,965
EDUCATIONAL DEVICE
Filed Dec. 5, 1935
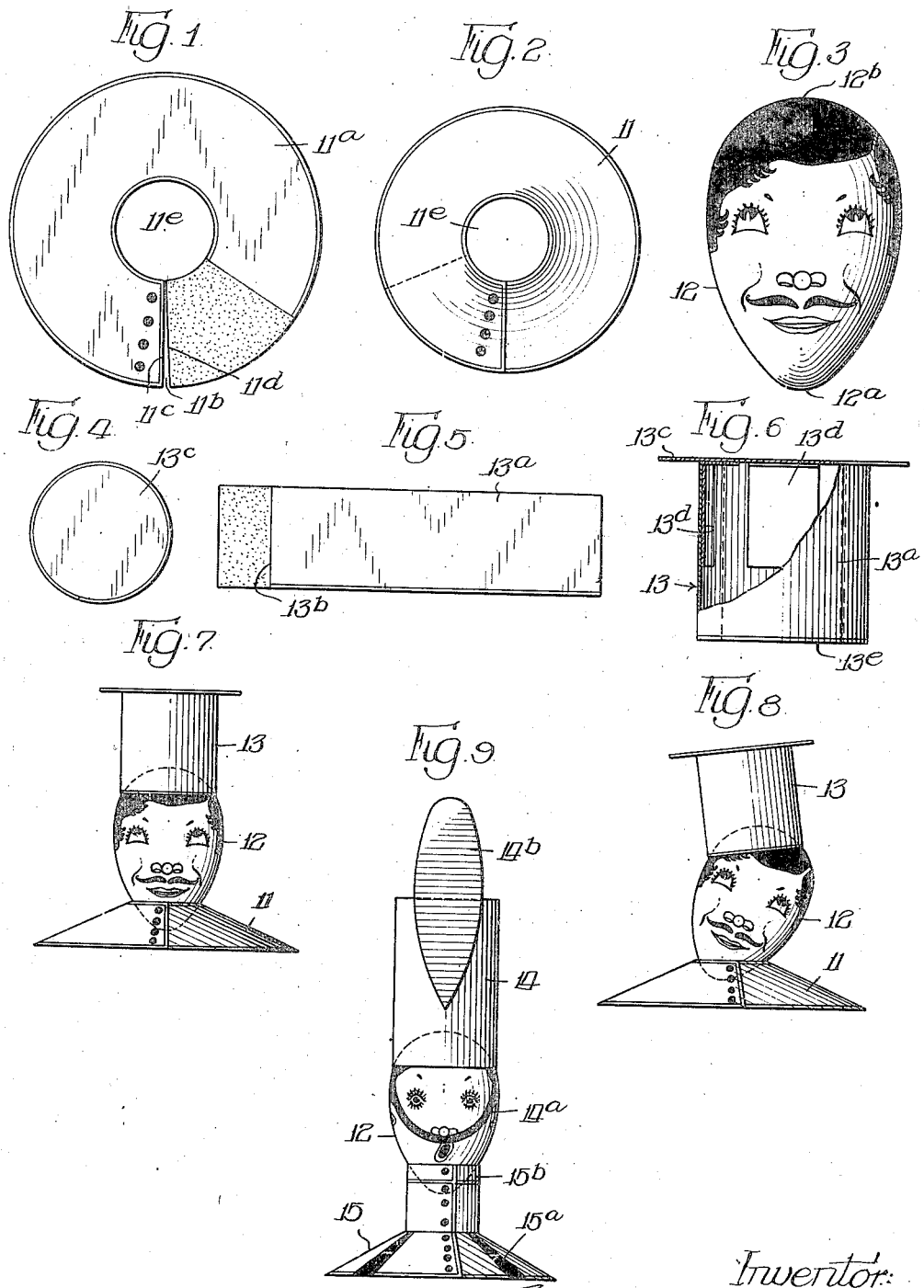

Patented Mar. 1, 1938

2,109,965

UNITED STATES PATENT OFFICE 2,109,965

EDUCATIONAL DEVICE

Neil S. Booth, Chicago, Ill.

Application December 5, 1935, Serial No. 52,950

5 Claims. (Cl. 46—151)

My invention pertains to educational devices and particularly to paper cut-outs and solids with fabrications therefrom lending themselves to coloring and assembly in various relationships, for the development of the imagination and artistic skill of the young.

The invention is preferably embodied in unit elements constituting bizarre representations of typical characters such as a soldier, a sailor, a baker, a clown, and the like. Specifically, for adaptation to the Easter season, an egg whether natural or artificial is employed as the head unit by reason of its adaptability for positioning at various angles to the body and to the drawing or painting thereon of grotesque features. I call the resultant figures "Easter Eggsters" by reason of their particular adaptation to utilization by children and grown-ups in the celebration of Easter.

The invention may find a practical expression in the marketing of suitably colored paper cut-outs and papier-mâché heads with printed instructions for assembly; or uncolored with suggestions for coloring or painting to produce various effects; or a sheet of outlined illustrations only according to which the embryo artist may do his own cutting and exercise his skill in reproducing the illustrations or his imagination and skill in providing variations thereof.

In order to facilitate an understanding of the invention, the accompanying drawing may represent an instruction sheet wherein Fig. 1 is a flat disk cut to annular form with a gap;

Fig. 2 is the sheet of Fig. 1 having its extremities overlapped and secured to form a truncated cone to serve as the base unit or shoulder;

Fig. 3 is an elongated preferably ovoid solid such as an egg, natural or artificial, adapted for painting to represent a head unit;

Fig. 4 is a disk to serve as the top of a hat unit;

Fig. 5 is a strip adapted to be rolled in a cylinder to form the body of the hat unit;

Fig. 6 is the complete hat formed from the elements represented in Figs. 4 and 5;

Figs. 7 and 8 illustrate complete figures formed from the several units when embellished and assembled in varying relationships; and Fig. 9 illustrates a soldier made up similarly from modified units.

Having particular reference to the drawing, there is represented in Figs. 1 to 5 inclusive the successive steps for forming the component part of the figure embodying the invention; it being understood that various shapes and details of embellishment come within the scope of the invention of which the drawing is but illustrative.

The reference numeral 11 designates the shoulder-pedestal formed from the annular disk 11a of Fig. 1 radially slit at 11b and bent in the general plane of the disk to overlap the margins 11c and 11d and thus form the truncated cone 11 with a central opening or recess 11e at the apex as shown in Fig. 2.

The elongated, preferably egg-shaped, solid 12 (Fig. 3) has superficially applied thereto by drawing or painting facial features of any desired type. This head unit 12 is seated with its smaller end 12a in the opening 11e, thus constituting a head upon the shoulders 11 which shoulder unit has drawn or painted thereon the representation of a suitable garb. By reason of the symmetrical shape of the chin end 12a the head can be variously positioned to bring its axis at different angles to the axis of the shoulders, as indicated in Figs. 7 and 8.

The hat unit 13 (Fig. 6) is made by rolling the strip 13a adjoining the overlapped ends of 13b to form a cylinder; whereupon the disk 13c is applied to close the upper end of the cylinder and is secured by small strips 13d glued to the under side of the disk and to the inner walls of the cylinder. The open end 13c of the cylinder is of such size as to set upon and embrace the larger end of the unit 12 forming the crown of the head, where it is frictionally held at any desired angle as indicated in Figs. 7 and 8.

As hereinbefore indicated the pedestal or shoulder unit 11 can be decorated as desired by drawing or painting thereon buttons, stripes or what not, as also can the hat, while the egg-shaped body serving as the head will have drawn thereon the hair, eyes, nose, mouth and ears to depict racial characteristics, laughter, grief,—a grotesque caricature as artistic fancy may dictate.

In Fig. 9 is shown an embodiment of the invention wherein the head unit has applied thereto a different type of features with the chin strap 14a of a military style of cap 14 having attached a plume 14b while the shoulder element 15 is embellished with shoulder straps 15a surmounted by a collar 15b formed from a short cylinder suitably embellished.

The relative sizes of the openings 11e of the shoulder and 13e of the hat on the one hand and the chin 12a and the crown 12b on the other hand are such that the head is supportable on the shoulders in stable equilibrium as is also the hat upon the head even though they be disposed at various rakish angles exemplified in Fig. 8.

This is accomplished by making the openings of sufficient capacity that a vertical line through the center of gravity of the superposed parts falls within the area of the opening whether the parts be disposed as in Fig. 7 or at decided relative angles as in Fig. 8.

It will be appreciated that this invention provides a very wide field for the exercise of imaginative and artistic skill in building up various combinations of dress and types of features; that by employing different styles of hats and shoulders and faces sets resulting in greatly diverse combinations may be devised, particularly due to the interchangeability of the parts and the production thereby of dissimilar types. It will also be apparent that diverse effects may be produced by a change in the angular relationship with the same identical units, as is exemplified by the difference in expression represented in Figs. 7 and 8; also, by reference to Fig. 8, it will be apparent in some cases that the hat unit may be omitted, dependence being had upon the position and/or ornamentation of the head to impart the desired characteristics.

I claim:

1. An educational device comprising an upwardly tapering shoulder pedestal, a terminally rounded head element mounted on said shoulder pedestal, and a hat element, the shoulder pedestal and hat being independent of but having a universal separable connection with the head.

2. An educational device comprising a truncated shoulder unit formed of paper, an ovoid head unit, and a cylindrical hat unit formed of paper, the shoulder unit having an upper recess and the hat unit a lower recess serving to receive the chin and crown portions of the head unit respectively and to form an unattached universal bearing therefor, the shoulder, the head and the hat adapted for decoration to represent different racial and sartorial characteristics.

3. An educational device comprising an inflexible egg-shaped head unit, a truncated paper cone as a shoulder unit with open apex to receive the smaller end of the head, and a paper cylinder as a hat unit fitting upon the larger end of the head, the head shiftable at varying angles to the shoulders and the hat while maintaining relative stable equilibrium, the several units adapted to be superficially decorated to represent different facial and sartorial characteristics.

4. An educational device comprising separate shoulder, head and hat units, the shoulder having a broad base with reduced top to impart inherent stability, the head unit having upper and lower rounded extremities, and the hat unit of general cylindrical shape, the upper extremity of the shoulder unit and one end of the hat unit provided with openings adapted to receive freely and frictionally engage the two ends of the head unit, said openings being sufficiently large to enable the head and hat units to be tilted relative to each other and to the shoulder unit while maintaining the center of gravity of each above its supporting unit whereby the facial expression of the head unit can be modified at will.

5. A set of educational devices each comprising a truncated hollow shoulder unit, an ovoid head unit with rounded upper and lower extremities, and a hollow hat unit, the shoulder unit having an upper recess and the hat unit a lower recess to receive the rounded lower and upper extremities respectively of the head unit to form an unattached ball and socket universal bearing therewith, the shoulder, hat and head units of the various devices being interchangeable to present different ensembles and adapted for decoration to represent different racial and sartorial characteristics.

NEIL S. BOOTH.